June 5, 1951           A. MEROLA           2,555,752
SHOVEL
Filed May 15, 1948
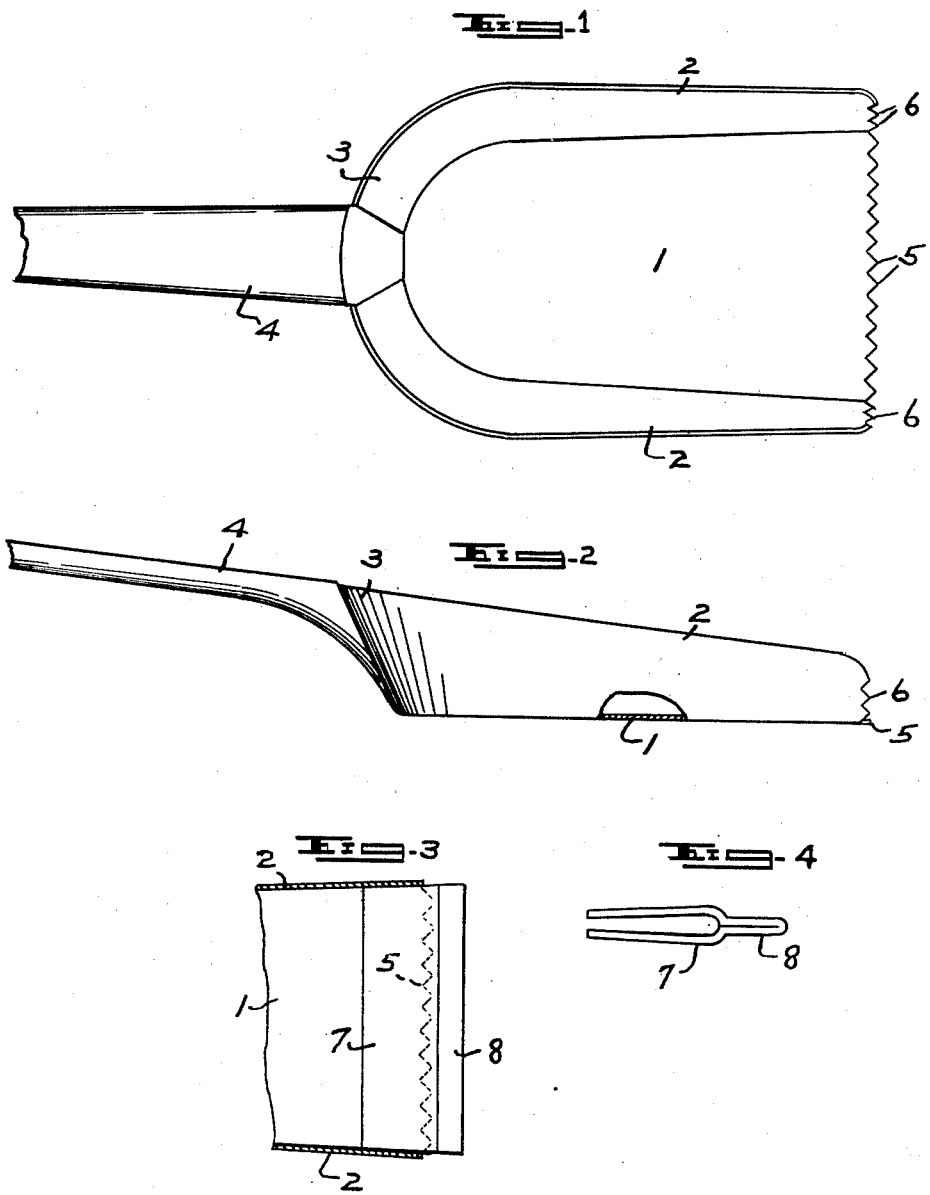
Inventor
ANTHONY MEROLA
Attorney

Patented June 5, 1951

2,555,752

UNITED STATES PATENT OFFICE 2,555,752

SHOVEL

Anthony Merola, Pittsburgh, Pa.

Application May 15, 1948, Serial No. 27,162

1 Claim. (Cl. 294—49)

This invention relates to an improved shovel, and while herein illustrated and described as embodied in a scoop type of shovel, it will be obvious that the invention may be incorporated in any other type of shovel wherein it is found to be applicable.

Important objects and advantages of the invention are to provide a shovel of the character described, which embodies a shovel blade having the front edge thereof formed with novel means for facilitating the insertion of the shovel blade into any type of material to be shovelled and in consequence rendering shovelling operations less difficult, which is simple in its construction and arrangement, efficient in its use, attractive in appearance, and comparatively economical in its manufacture.

With the foregoing and other objects in view which will appear as the description proceeds, the invention resides in the novel construction, combination and arrangement of parts herein specifically described and illustrated in the accompanying drawing, but it is to be understood that changes in the form, proportions and details of construction may be resorted to that come within the scope of the claim hereunto appended.

In the drawing wherein like numerals of reference designate corresponding parts throughout the several views:

Figure 1 is a top plan view of a shovel constructed in accordance with the invention.

Figure 2 is a side elevational view thereof, partly in section.

Figure 3 is a fragmentary top plan view of the front end portion of the shovel blade with the front edge of the latter enclosed by a nose-piece.

Figure 4 is an enlarged end view of the nose-piece.

Referring in detail to the drawing, the illustrated drawing of the shovel is generally of the conventional scoop-type commonly employed in homes for conveying coal or like fuel from a container to the stove.

The shovel comprises a flat shovel blade 1 provided with integrally formed side walls 2, and a rounded rear wall 3, to which latter a handle 4 is rigidly attached in the usual manner. The walls 2 and 3 are comparatively low and flare slightly outward from the vertical, and taper toward their forward ends.

The shovel is constructed of sheet metal, and the front end edge of the blade 1 thereof is serrated by the formation of a plurality of regularly spaced teeth 5. In like manner, the front end edges of the side walls 2 are formed with teeth 6.

It will be apparent that, due to the serrated ends of the shovel blade 1 and side walls 2, the shovel may be more readily pushed into any class of material, particularly lump material in the form of coal and the like, and thereby greatly facilitating the shovelling operations.

A removable sheet metal nose-piece 7, including a flattened forward end portion 8, is provided for covering the teeth 5 of the blade 1 when it is desired to use the shovel as a dust pan for gathering dust and like sweepings. The nose-piece is substantially U-shaped in transverse section, and is held in position by frictionally overlapping the serrated end of the shovel blade and by the wedging action of the ends thereof against the side walls 2. It is, of course, evident that the nose-piece may be detachably secured to the shovel blade in any other suitable manner to best meet conditions found in practice.

The present invention provides a most efficient device of its kind, which may be economically constructed and successfully employed for the purposes and in the manner herein set forth.

What I claim is:

A shovel of the class described, comprising the combination of a flat shovel blade, a pair of side walls formed integral with said blade, a rounded rear wall formed integral with said blade and with said side walls, said side walls and said rear wall flaring outwardly and tapering toward the forward ends thereof, a handle secured to said rear wall, a plurality of regularly arranged teeth formed integral with the forward end edge of said blade, a plurality of forwardly projecting teeth formed integral with the forward end edge of each of said pair of side walls, and a nose-piece substantially U-shaped in transverse section and including a reduced flattened forward edge portion detachably engageable on said blade for completely enclosing the teeth on said blade, said nose-piece held in position on said blade by the frictional engagement of said nose-piece on said blade and by the wedging action of the ends thereof against respective end walls.

ANTHONY MEROLA.

REFERENCES CITED

The following references are of record in the file of this patent:

UNITED STATES PATENTS

| Number | Name | Date |
| --- | --- | --- |
| 64,442 | Nelson | May 7, 1867 |
| 111,939 | Hubbard | Feb. 21, 1871 |
| 249,665 | Pettebone | Nov. 15, 1881 |
| 339,527 | Calef | Apr. 6, 1886 |
| 342,961 | Hicks | June 1, 1886 |
| 467,971 | Hammer | Feb. 2, 1892 |
| 902,983 | Manahan | Nov. 3, 1908 |
| 1,023,849 | Huish | Apr. 23, 1912 |
| 1,571,818 | Ternan et al. | Feb. 2, 1926 |